(No Model.)
S. C. HILLS.
SCREW CUTTING CHUCK.
No. 581,990. Patented May 4, 1897.
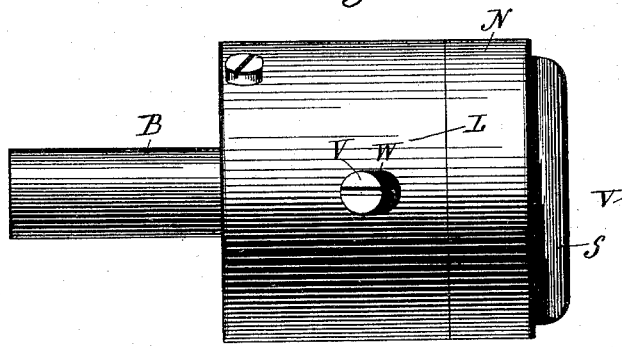
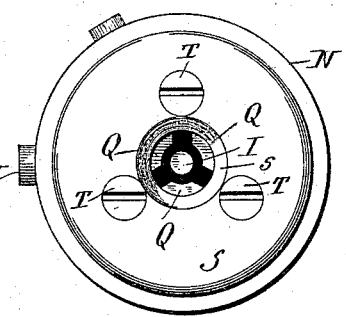
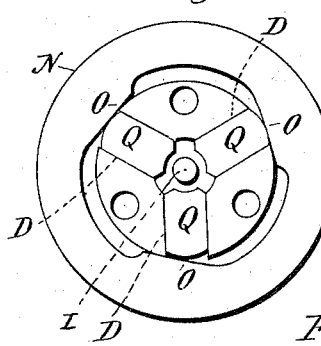
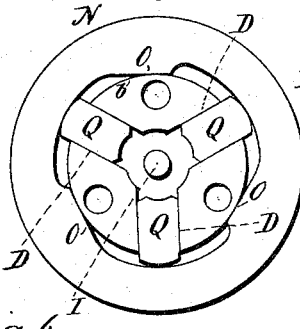
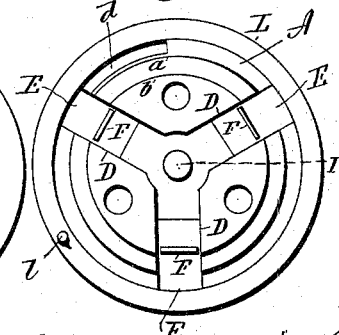
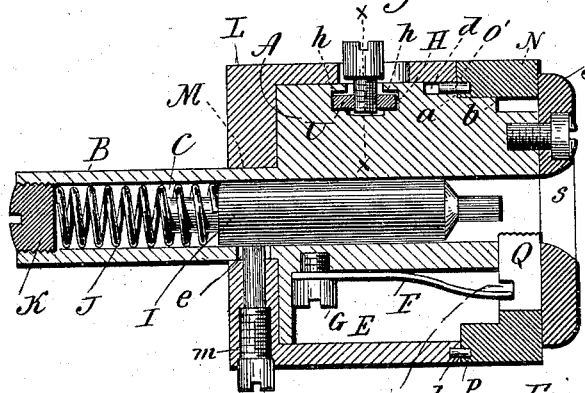
Witnesses:
J. H. Shumway
Ellen Scarborough
Sidney C. Hills, Inventor.
By attys
Earle Seymour

UNITED STATES PATENT OFFICE.

SIDNEY C. HILLS, OF TORRINGTON, CONNECTICUT.

SCREW-CUTTING CHUCK.

SPECIFICATION forming part of Letters Patent No. 581,990, dated May 4, 1897.

Application filed March 1, 1897. Serial No. 625,458. (No model.)

*To all whom it may concern:*

Be it known that I, SIDNEY C. HILLS, of Torrington, in the county of Litchfield and State of Connecticut, have invented a new Improvement in Screw-Cutting Chucks; and I do hereby declare the following, when taken in connection with the accompanying drawings and the letters of reference marked thereon, to be a full, clear, and exact description of the same, and which said drawings constitute part of this specification, and represent, in—

Figure 1, a side view; Fig. 2, a face view; Fig. 3, a face view with the retaining-cap removed and the jaws in the closed position; Fig. 4, a similar view with the jaws in the open position; Fig. 5, an end view with the cap and jaws removed; Fig. 6, a sectional view; Fig. 7, a side view of the head detached; Fig. 8, a side view of the ring detached; Fig. 9, a sectional view on the line $x$ $x$ of Fig. 6.

This invention relates to an improvement in screw-cutting chucks, and particularly to that class in which the cutters are adjustable for cutting various sizes of screws and which are provided with means for opening the cutting-dies when the screw has been cut to a predetermined length, the object of the invention being a construction which is cheap to manufacture and effective in operation; and it consists in the construction as hereinafter described, and particularly recited in the claims.

The chuck consists of a head A and stem B, formed integral therewith. The outer end of the head is differentiated in diameter to form shoulders $a$ and $b$. Longitudinally through the center of the head and stem B is an opening C, and in the outer face of the head are radial grooves D, here shown as three in number. The outer surface of the body is also formed with longitudinal grooves E, which intersect the radial grooves D, and in the grooves E are springs F, which are secured at the lower ends of the grooves by screws G and project at their outer ends into the radial grooves D, the lower ends of the said grooves E being enlarged to receive the heads of the screws G. In one side of the head is an undercut recess H, forming side flanges $h$, the purpose of which will hereinafter appear. A portion of the head below the shoulder $a$ is also cut away to form a clearance-space $d$. In the stem B, near the head A, are elongated openings $e$. In the longitudinal opening C are arranged a plunger I, reduced at its outer end, and a spring J. The outer end of the stem is closed by a screw-plug K, which forms a bearing for the spring J, the outer end of the spring being seated against the inner end of the plunger.

Over the head A is arranged a cup-like shell L, corresponding in internal diameter to the external diameter of the said head and formed with a central opening M, corresponding in diameter to the diameter of the stem B, the said shell extending over the said head to a point in line with the shoulder $a$ and so as to stand flush therewith.

In the outer edge of the shell is a stud $l$, and through the bottom are radial openings $m$, which extend into the opening M, and in these openings $m$ are arranged screws the inner ends of which are adapted to extend through the openings $e$ in the stem and against the plunger I.

Over the outer end of the head is a ring N, corresponding in external diameter to the shell L and adapted to ride upon the shoulder $a$ and formed with inwardly-extending cam-faces O, which project over the shoulder $b$. The inner edge of this ring is formed with a stud O', adapted to extend into the recess $d$ in the head, and with a hole P, corresponding in size to the stud $l$ in the shell L.

In the radial grooves D are jaws Q, formed at their inner ends with cutting-faces and rounded at their outer ends. In their under faces are slots R to receive the ends of the springs F, which tend to hold the jaws outward against the inner face of the ring. These jaws and the ring N are held in place by a cap S, having a central opening $s$ and secured to the outer face of the head A by screws T. In the recess H is a nut U, adapted to receive a screw-stud V, which extends outward through a slot W, formed in the shell L.

In assembling the device the plunger I is forced inward to depress the spring J, and the screws $m$ are turned inward to bind against the plunger and so as to interlock it with the shell L, and so that its outer end stands just below the cutting-faces of the dies Q, the spring J tending to hold the shell L forward over the head A and the stud *l* against the inner edge of the ring N. The shell is held against rotation on the head by the stud V, which is held by the nut U binding against the under faces of the flanges *h* of the recess H. Assuming that the jaws are in the open position shown in Fig. 4, the ring N is turned to bring the cams O against the outer ends of the said jaws and force them inward, as shown in Fig. 3, and the ring into a position over the stud *l*, which, under the action of the spring J, will be forced into the said hole P and so as to lock the ring in this position, and hence hold the jaws in the closed position. If then a rod is fed into the chuck, it will, after being threaded, press against the outer end of the plunger I and force it inward, and this plunger, being locked with the shell, will force the shell from the head and remove the stud *l* from engagement with the ring N. The springs F force the jaws Q outward and, owing to the inclination of the cam-faces O of the said ring, tend to turn the ring and allow the jaws to open, the movement of the said ring being limited in its opening movement by the pin O' in the recess *d*. The screw-stud V is adjusted to allow the sleeve to be turned to bring the stud *l* in the desired position with relation to the ring N, so as to engage with the hole P therein when the jaws are set to cut a screw of the desired diameter. The ring may be knurled or provided with a hole to receive a pin for turning it.

Having fully described my invention, what I claim as new, and desire to secure by Letters Patent, is—

1. In a chuck, the combination with a head and stem formed with a central opening, a spring-plunger arranged in the said opening, longitudinal grooves in the sides of said head, and radial grooves in its outer face intersecting said longitudinal grooves, springs in the said longitudinal grooves, and projecting into said radial grooves, jaws in said radial grooves, and engaged with said springs, a shell surrounding said head, and adapted to be clamped to said spring-plunger so as to be moved thereby, a ring mounted on the outer end of said head, formed with cam-faces for engagement with the outer ends of said jaws and adapted to be detachably coupled with said shoulder when the jaws are in the closed position, substantially as described.

2. In a chuck, the combination with a head and stem formed with a central opening, a spring-plunger arranged in the said opening, longitudinal grooves in the sides of said head and radial grooves in its outer face intersecting said longitudinal grooves, springs in the said longitudinal grooves and projecting into said radial grooves, jaws in the said radial grooves, and engaged with said springs, a shell surrounding said head and adapted to be clamped to said spring-plunger so as to be moved thereby, a stud adjustably secured to said head, and projecting through said shell for locking the same against rotation, and a ring mounted on the outer end of said head formed with cam-faces for engagement with the outer ends of said jaws and adapted to be detachably coupled with said shoulder when the jaws are in the closed position.

3. In a chuck, the combination with a head and stem formed with a central opening, a spring-plunger arranged in the said opening, longitudinal grooves in the sides of said head, and radial grooves in its outer face intersecting said longitudinal grooves, springs in the said longitudinal grooves and projecting into said radial grooves, jaws in the said radial grooves and engaged with said springs, a shell surrounding said head and adapted to be clamped to said spring-plunger so as to be moved thereby, a stud adjustably secured to said head, and projecting through said shell for locking the same against rotation, a stud in the outer edge of said shell, and a ring mounted on the outer end of said head, and formed with cam-faces for engagement with the outer ends of said jaws, and with a hole to receive the stud in the edge of said shell, substantially as described.

In testimony whereof I have signed this specification in the presence of two subscribing witnesses.

SIDNEY C. HILLS.

Witnesses:
 GEO. H. ATKINS,
 G. F. DODGE.